No. 615,954. Patented Dec. 13, 1898.
C. S. BRADLEY.
CHANGING PERIOD AND PHASE OF ALTERNATING CURRENTS.
(Application filed June 22, 1896. Renewed Nov. 17, 1898.)
(No Model.)
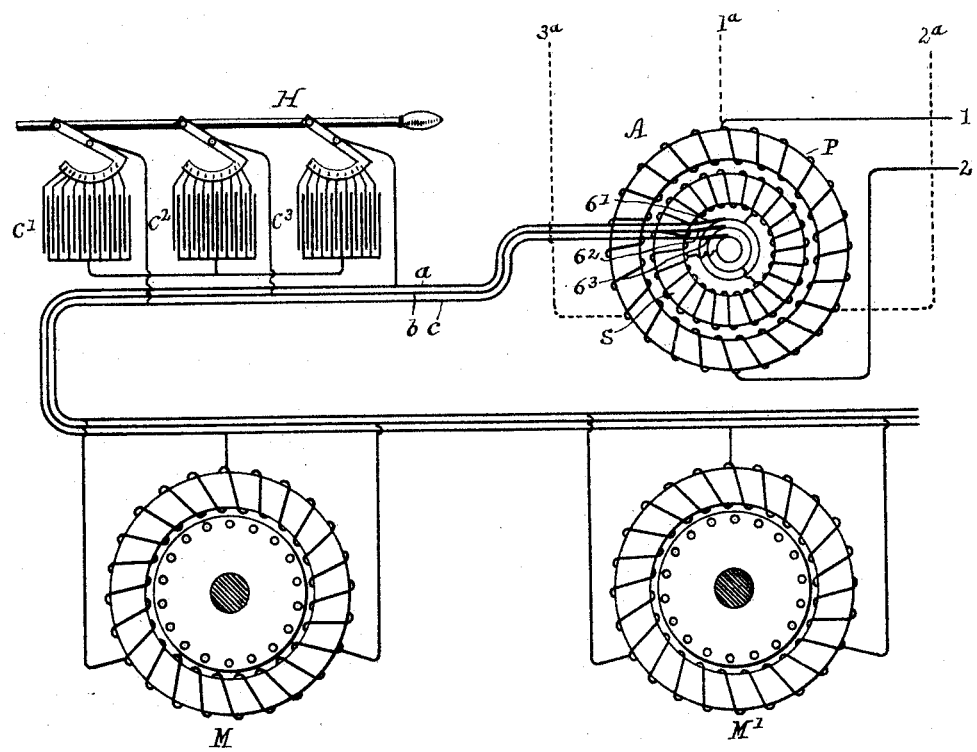
WITNESSES:
INVENTOR
Charles S. Bradley
BY
ATTORNEY

UNITED STATES PATENT OFFICE.

CHARLES S. BRADLEY, OF AVON, NEW YORK, ASSIGNOR TO THE GENERAL ELECTRIC COMPANY, OF NEW YORK.

CHANGING PERIOD AND PHASE OF ALTERNATING CURRENTS.

SPECIFICATION forming part of Letters Patent No. 615,954, dated December 13, 1898.

Application filed June 22, 1896. Renewed November 17, 1898. Serial No. 696,737. (No model.)

*To all whom it may concern:*

Be it known that I, CHARLES S. BRADLEY, a citizen of the United States, and a resident of Avon, in the county of Livingston and State of New York, have invented certain new and useful Improvements in Changing the Period and Phase of Alternating Currents, of which the following is a specification.

The object of this invention is to permit the period or rate of an alternating current or a plurality of such currents to be changed and varied as desired for the operation of motors and other translating devices and to permit a single alternating current, or more than one, to be converted into any desired number of phasially different currents.

In carrying out the invention I operate a motor-generator the primary winding of which is adapted, either alone or by the assistance of the armature reaction, to develop a rotary magnetic field and the secondary or generating winding of which is connected in circuit with devices for varying the capacity or inductance, or both, to render said circuit consonous to a desired rate of alternation needed in a consumption or distribution circuit. I have described a motor operating under control of such adjusting devices in a patent granted to me April 7, 1896, No. 557,957. The generating-winding of the motor-generator may generate any rate of alternation, depending on the capacity-inductance product of the winding and its connected circuits. The condition of adjustment is approximately determined by the formula for electrical resonance in which the capacity of the circuits multiplied by their inductance equals twenty-five thousand three hundred, divided by the square of the rate of alternation. When such an adjustment is made for a desired rate of alternation, the circuits are in electrical consonance, as fully set forth in my patent above referred to. In an organization of this kind the devices which are provided for varying the capacity-inductance product are set for the period or rate desired, and the motor-generator will then develop such rate. The generating-winding may be opened or tapped at any desired number of symmetrically-distributed points, and from such points currents differing in phase may be taken. The motor-generator may be driven by a single-phase current delivered to its magnetizing-winding or by a polyphase current delivered thereto.

My invention therefore comprises a method of altering the time period of an alternating current consisting in charging one element with an alternating current to charge the same magnetically and create a shifting magnetic field and adjusting the circuits of a co-operating element movable with relation to the other, so as to render them electrically consonous at the rate of alternation desired.

It comprises also a motor-generator provided with a magnetizing-winding and a secondary winding relatively movable thereto adjusted or capable of adjustment to produce electrical consonance with the desired time period or rate of alternation.

It comprises also such an organization provided with distributing connections to produce any desired number of phases in a consumption-circuit. An organization of this kind is especially advantageous in certain kinds of work—as, for example, in operating trains of cars, where a number of induction-motors are simultaneously started and controlled. It is desirable with such motors that in starting up they should be supplied with currents of slow rate or long period and that as they gain in speed the rate should be quickened.

In the accompanying drawing, which illustrates, diagrammatically, my invention, A is a motor-generator the primary element P of which is provided with a winding connected with a supply-circuit 1 2 or $1^a 2^a 3^a$. For convenience of explanation we will first assume that the winding is a closed coil tapped at three symmetrical points and connected with a triphase supply-circuit $1^a 2^a 3^a$. A rotary magnetic field will under such conditions be set up in the primary core. In inductive relation to the rotary field is a secondary or generating element S, the winding of which leads through brushes $b' b^2 b^3$ into a circuit including devices for varying the capacity-inductance product of the secondary winding and its connected external circuit. These devices are preferably condensers $c' c^2 c^3$ in each branch of the polyphase circuit connecting with the brushes $b'$ $b^2$ $b^3$, which are rendered adjustable by any suitable device for varying their surface. As shown, a common controlling-handle H may actuate a switch-lever in each condenser branch and graduate by a single movement the capacity of all the condensers similarly. The inductance factor of the equation which determines consonance may, however, be varied instead of the capacity with similar results. As this matter of the interchangeability of condensers and inductance for this purpose was fully considered in my patent hereinbefore referred to it need not be further described here. In parallel arc with the condensers are distributing-mains $a\ b\ c$ of a consumption-circuit supplying translating devices. Induction-motors are shown at M M', since the invention is especially applicable to their operation. Other devices may, however, be supplied, if desired. When the motor-generator is in operation, the secondary element follows the rotary field; but as its magnetization depends upon the "slip" between the movable and fixed elements of the generator the secondary currents generated will obviously be of slower rate than the primary currents. The rate is, however, dependent upon the capacity-inductance product of its circuits. If the condensers are adjusted for a low rate, the generator will assume a definite speed closely approximating this predetermined rate. Either the primary or the secondary element of the generator may be the movable member. If a single-phase charging-current be employed, as indicated in full lines, the reaction of the secondary member and the condensers will assist the single-phase current in developing a rotary field in the primary element P, and similar results to those hereinbefore described will ensue in the generating and consumption circuits. With a single-phase system an auxiliary device for starting the motor-generator must be used. On starting up the motors the lowest rate in the circuit which supplies them is desirable, which will of course require the greatest capacity-inductance product to produce electrical consonance. If capacity be the variable factor, the maximum amount of such capacity should be in circuit when the motors are starting. This condition of adjustment is shown in the drawing. This adjustment furnishes the greatest storage capacity just when it is needed to give torque to the motors. Moreover, as the revolving element of the motor-generator is at such a time operating at a maximum speed, because the rate is lowest when the difference in speed of the two generator elements is least, great momentum is stored, which greatly adds to the starting efforts of the motors. As the motors rise in speed the condenser is reduced, slowing down the generator. The maximum capacity of the condensers should be of a value to produce consonance when all of the motors are starting and are at low speed. In shutting down the motors the condensers may be all cut in gradually, thereby destroying the consonous adjustment for the higher rate of alternation under which the motors were operating and reducing the torque, thus causing the motors to slow down. In controlling the speed of the motors the condenser-switch should be gradually shifted, thereby altering the capacity by degrees, and consequently altering the speed of the motor-generator and motors. If several cars are cut off and the number of supplied motors reduced, the inductance will be only fractionally altered, since the motors are in multiple arc with the supply-circuit.

Having thus described my invention, what I claim as new, and desire to secure by Letters Patent, is—

1. The method of altering the rate of an alternating current consisting in leading said current through a motor-generator, feeding a work-circuit from the secondary of said generator, and controlling the rate by altering the phase relation of the work-current.

2. The method of changing the rate of an alternating current, consisting in setting up a magnetic field by said current, and operating in inductive relation thereto a circuit rendered consonous to the desired rate.

3. The method of changing the rate of an alternating current, consisting in setting up a shifting magnetic field by said current, driving a motor element thereby, and adjusting the capacity-inductance product of the secondary circuit for the desired rate.

4. The method of producing a variable rate from an alternating current of definite rate, consisting in operating an induction-motor generator thereby, and varying the capacity-inductance product of the secondary circuit of the motor-generator.

5. The combination of a motor-generator comprising a primary winding, a secondary winding, condensers connected with said secondary winding, and translating devices supplied by said secondary winding.

6. A motor-generator provided with a field-magnet adapted to be charged by an alternating current, and an armature including a condenser in its circuit.

7. A motor-generator provided with a field-magnet adapted to be charged by an alternating current, and an armature including devices for varying the capacity-inductance product of its circuit.

8. A motor-generator provided with a field-magnet adapted to be charged by an alternating current, and a polyphase armature having a condenser in each circuit.

9. A motor-generator provided with a field-magnet adapted to be charged by an alternating current, and a polyphase armature having in each circuit devices for varying the capacity-inductance product.

10. A motor-generator provided with a rotary field-winding, and an armature having an adjustable condenser in its circuit.

11. A motor-generator provided with a field-magnet adapted to be charged by an alternating current, an armature having its circuits adjusted for electrical consonance, and connections with said armature for leading off a different number of phases from those led into the primary.

12. The combination of an alternating-current-supply circuit, a motor-generator driven thereby, a consumption-circuit, containing one or more induction-motors fed by the secondary of the motor-generator, and condensers in said secondary circuit.

In testimony whereof I have hereunto subscribed my name this 23d day of May, A. D. 1896.

CHARLES S. BRADLEY.

Witnesses:
C. R. WATERBURY,
ROBT. H. READ.